United States Patent Office 2,734,884
Patented Feb. 14, 1956

2,734,884

ALKYL ESTERS AND PLASTIC COMPOSITIONS COMPRISING SAME

Paul V. Smith, Jr., and David W. Young, Westfield, N. J., assignors to Esso Research and Engineering Company, a corporation of Delaware No Drawing. Application April 1, 1952, Serial No. 279,915

7 Claims. (Cl. 260—31.8)

This invention relates to a new class of esters which have been discovered to be particularly effective as plasticizers for resins and rubber-like materials. In particular, this invention relates to certain nonvolatile branched chain alkyl esters such as certain esters of $C_{10}$ alcohols.

The ever expanding use of plastic materials such as vinyl chloride polymers or copolymers, polyvinyl acetate, cellulose esters, acrylate and methacrylate resins, rubbers such as emulsion copolymers of butadiene with styrene or acrylonitrile, or the copolymers of isobutylene with small amounts of a diolefin such as isoprene have created a large demand for suitable plasticizers. Alkyl esters and particularly di-2-ethylhexyl phthalate, di-n-octyl phthalate and tri-2-ethyl-hexyl phosphate have been known to be satisfactory plasticizers for the aforementioned high molecular weight materials, but the supply of these plasticizers has been unable to keep pace with the expansion of the plastics industry, largely because of a shortage of alcohols suitable for the manufacture of desired esters.

It is the object of this invention to provide the art with a new source of esters of polybasic acids. Another object is the production of plastic compositions having superior physical and chemical properties. Still other objects will appear from the subsequent description.

It has now been discovered that new alkyl esters of polybasic acids, in which the alkyl groups predominantly contain 10 carbon atoms in a branched chain structure, can be prepared from certain novel monohydric aliphatic alcohol mixtures, and it has been discovered further that certain synthetic decyl alcohol mixtures gives esters unexpectedly superior to comparable esters previously known.

The properties of a plasticizer which are most important are high plasticizing efficiency and low volatility. Usually, when changes are made to improve one of these properties, the other is adversely affected. For example, an increase in alcohol molecular weight tends to reduce volatility at the expense of plasticizing efficiency. However, the esters of this invention show the unexpected properties of both low volatility and increased flexibility at low temperatures, particularly after aging.

The alcohol mixtures required for the present invention are best obtained by the "OXO" process. The term "OXO" process is understood in the art as referring to a process wherein an olefin feed is first reacted or "oxonated" with carbon monoxide and hydrogen at a temperature between 280° and 400° F. and under a pressure of about 150 to 400 atmospheres in the presence of a cobalt catalyst to form aldehydes in accordance with the following reaction:

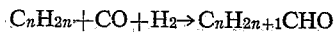

and the aldehydes are then catalytically hydrogenated to form the desired alcohols as follows:

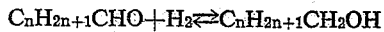

The preferred hydrogenation catalyst is nickel though other known hydrogenation catalysts such as the sulfides of nickel, molybdenum and cobalt, with or without support on carbon, silica, etc., can also be used, especially where a rugged catalyst is desired. The basic principles and operating conditions of the "OXO" process which can be used for making the desired alcohols are described, for example, in U. S. Patent 2,327,086 and elsewhere.

In discussing the OXO reaction of olefin hydrocarbons, it has been found convenient to classify the various olefins into five fundamental types according to the character of carbon atoms linked by the olefinic bonds. These five types are as follows:

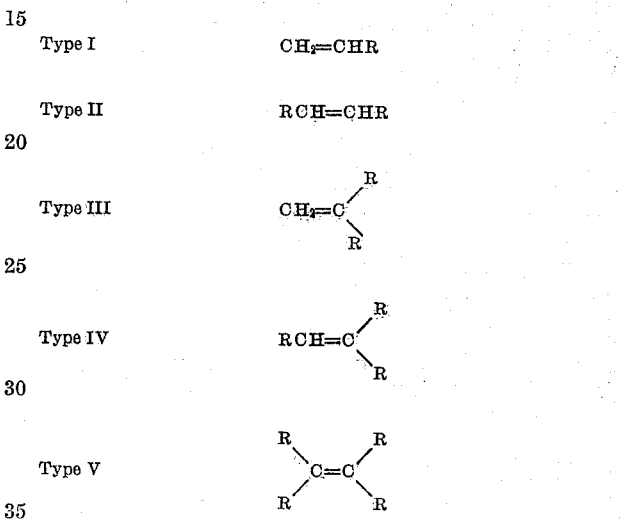

In the above formulas, R represents a straight or a branched chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetra-methyl ethylene is a Type V olefin; and so forth.

In the OXO reactions, generally, there is no invariable point of attack on the olefinic double bond such as one might predict from Markownikoff's rule, and thus in the case of Type I olefins of the formula $H_2C=CHCH_2R$ approximately equal amounts of both 1-substituted alcohols of the formula $CH_2OHCH_2CH_2CH_2R$ and 2-substituted alcohols of the formula $CH_3.CH(CH_2OH).CH_2R$ are formed, with the 1-position being slightly favored. It is thus apparent that the OXO process is inherently committed to the production of at least some branched-chain primary alcohols even when the starting material is a pure Type I straight-chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

Particularly effective plasticizers can be prepared according to this invention from alcohols derived from a carefully fractionated $C_9$ cut. Such a $C_9$ cut can best be obtained by polymerization of propylene. For example, a typical feed used for preparing a $C_9$ cut useful for the purposes of the present invention contains mainly branched chain nonenes. A typical C₉ polymer cut resulting from such a feed had the following composition:

Olefins:                                    Percent
    Type I ............................... 1 to 2
    Type II .............................. 14 to 16
    Type III ............................. 8 to 9
    Type IV .............................. 30 to 35
    Type V ............................... 38 to 42

The alcohols formed by oxonation of the olefinic materials described above are naturally quite complex in character and the exact composition of many of these products is not known. The C₁₀ OXO alcohols obtained from the C₉ cut have been found to comprise a mixture of isomers having, on the average, alkyl side groups of one to three carbon atoms attached to a principal paraffinic chain of six to eight carbon atoms. In other words, the mixture of C₁₀ alcohols useful for the purposes of the present invention consists essentially of isomers having the formula

wherein R stands for hydrogen, methyl or ethyl, R₁ stands for hydrogen, methyl or isopropyl, R₂, R₃, R₄ and R₅ stand for hydrogen, methyl, ethyl and isopropyl, and wherein R plus R₁ plus R₂ plus R₃ contain a total of 4 carbon atoms.

More particularly, the C₁₀ alcohol which is especially outstanding for the purposes of the present invention consists essentially of a mixture of isomeric alcohols of the following compositions $$CH_2OHCR_1HCR_2R_3H \text{ and } CRH_2CR_2R_3CH_2OH$$

where R₁ may have from 1 to 5 carbon atoms and wherein R₁+R₂+R₃ contain a total of 7 carbon atoms. Some unreacted olefin, traces of aldehyde, acetal and ester may also be present. It is advantageous to wash the resulting mixture with a dilute aqueous solution of sodium hydroxide, preferably at a moderate temperature, e. g. around 60° C.

One typical C₁₀ alcohol cut has been found to have the following characteristics:

TABLE I

*Analytical data obtained on isodecyl alcohol*

Alcohol c. eq./gm............ 0.622 (98.1% as C₁₀ alc.)
1 hr. carbonyl c. eq./gm..... 0.000
5 hr. carbonyl............... 0.002 (0.9% as C₃₀ acetal)
Acid c. eq./gm............... 0.000
Ester........................ 0.000
Bromine No. Cg. Br/gm........ 0.61
H₂O, wt. percent............. 0.21
Kin. visc. at 20° C. cs...... 21.3
ASTM boiling range, ° C...... 210.0–220.0
Sulfur, p. p. m.............. 53
Molecular weight............. 156 (158 theoretical)
Phthalate ester visc. at 20°
    C. cs.................... 134.0.

Useful polyalkyl esters of the present invention prepared from the aforementioned C₁₀ OXO alcohols include phthalates, azelates, sebacates, and diglycolates or mixtures thereof with the esters of phthalic acid with C₈ OXO alcohols, hereinafter known as diisooctyl phthalate. These esters can be prepared by any of the conventional methods, as by reacting the alcohol with acid, or with acid anhydride, or with acid chloride or oxychloride, or by first transforming the alcohol into an alkyl halide and then reacting the latter with a metal salt of the selected acid. For example, phthalate esters may be prepared efficiently by reacting about 2 mols of a suitable alcohol with one mol of phthalic anhydride, without any catalyst or in the presence of sulfuric or preferably toluene sulfonic acid catalyst and using a solvent such as benzene as entrainer.

The invention does not rest in the process of making the new esters, but rather in the esters themselves as plasticizers which, due to the particular choice of alcohols used in their preparation, possess a superior and unexpected combination of properties. As described above, where particularly pure and colorless esters having good plasticizing action at low temperatures are desired, it is important first to subject the crude OXO alcohol to a distillation at pot temperatures preferably not exceeding about 240° C. and preferably with previous caustic treatment, to remove minor impurities such as aldehydes, acids, esters, acetals, unsaturated carbonyl compounds, etc. The larger the alcohol distillate recovery on distillation of a given crude OXO alcohol, the poorer the quality of the ester product prepared therefrom, and for best results the oxanol cut should correspond to a yield of about 50 to 70% based on the crude alcohol product.

The effectiveness of the novel esters of this invention as plasticizers is shown in the runs evaluated in Table II wherein a commercial polyvinyl chloride resin known as Geon 101 was chosen as the illustrative material. In preparing the test samples, 100 grams of the resin were dry-blended by hand with 3 grams of basic lead carbonate and 1.5 grams of stearic acid. Instead of the lead carbonate, 1 to 5 parts per 100 parts of resin of other basically reactive stabilizers could be used. The dry mixture was heated in a beaker with 50 grams of plasticizers and stirred to give a homogeneous blend whereupon the latter was charged to a 6 x 12 inch laboratory mill heated with steam to about 280 to 320° F. The resin was then fluxed about two minutes and allowed to mill with a rolling bank for five minutes with occasional cutting. Qualitative tests indicated that different combinations of vinyl resins and plasticizer required somewhat different mill temperatures to obtain a good mix in five minutes. After mill mixing, the stock was sheeted off at 0.075 to 0.15 inch thickness.

In general, it was observed that the novel esters flux or solvate high molecular weight vinyl resins at the usual milling temperatures noticeably faster than similar esters previously known. This is a very important factor since it has long been recognized that prolonged exposure of a vinyl resin stock to heat during processing or later has a permanent adverse effect on the stability and physical properties of such a stock. The improved fluxing properties of the novel plasticizers thus have a direct beneficial effect on the properties of the plasticized resin in that these plasticizers make it possible to reduce the total high temperature history of the resin stock.

The sheeted stock was then molded at 280° F. in a standard A. S. T. M. mold (D16–41) yielding slabs 6 x 6 x 0.075 inch. The molding cycle was 10 minutes at minimum ram pressure to allow free flow of the resin, followed by 10 minutes at 900 lbs./sq. in. The molded slabs were allowed to stand near 75° F. for at least one day before testing.

Tensile properties were determined in the usual manner on a Scott tester (model L–3) at about 75° F. and 50% relative humidity, the rate of jaw separation being 20 inches per minute. Brittle temperature was determined as described under ASTM D746–44T. Heat aging characteristics were measured in a hot air circulating oven designed to give reproducible results. The specimens tested were cut from molded slabs with die C (ASTM D412–41).

The dynamic modulus was determined by measuring the force developed in a plasticized vinyl film under conditions of 10% static deformation and 0.7% oscillatory deformation at 15 cycles per second. Values are expressed in p. s. i.×10⁴. As indicated in the data, diisodecyl azelate and diisodecyl sebacate are too insoluble in vinyl resins to be used as such, but must be used in conjunction with a solubilizer such as diisooctyl phthalate.

The results are summarized in Table II.

TABLE II

*Properties of diisodecyl esters in vinyl resins*

ORIGINAL PHYSICALS

| Plasticizer | 1 Di-2-Ethyl Hexyl Phthalate | 2 Di-isooctyl Phthalate | 3 Diisodecyl Diglycolate | 4 Di-$C_{10}$ Phthalate | 5 Diisodecyl Sebacate | 6 Diisodecyl Azelate | 7 Blend Diisodecyl Sebacate Diisooctyl Phthalate | 8 Blend Diisodecyl Azelate Diisooctyl Phthalate |
|---|---|---|---|---|---|---|---|---|
| Tens., Elong | 2,995-280 | 3,025-270 | 2,760-260 | 2,900-260 | Incompatible | Incompatible | 2,890-315 | 2,790-305 |
| Mod., 100% | 2,065 | 2,170 | 1,950 | 2,205 | | | 1,810 | 1,780 |
| Per Cent Light Transmission | 69 | 78 | 62 | 77 | | | | |

OVEN AGED 4 DAYS @ 100° C.

| | | | | | | | | |
|---|---|---|---|---|---|---|---|---|
| Tens., Elong | 2,890-190 | 2,165-85 | 1,975-100 | 2,295-115 | | | 2,175-175 | 1,950-140 |
| Mod., 100% | 2,630 | 1,915 | 1,695 | 2,205 | | | 1,805 | 1,785 |
| Per Cent Retained (Tens., Elong.) | 96-68 | 72-31 | 72-38 | 79-44 | | | (75-56) | (70-46) |
| Per Cent Light Transmission | 19 | 18 | 16 | 15 | | | | |

OVEN AGED 7 DAYS @ 100° C.

| | | | | | | | | |
|---|---|---|---|---|---|---|---|---|
| Tens., Elong | 2,920-175 | 2,025-40 | 2,220-100 | 2,405-120 | | | 2,075-115 | 1,990-110 |
| Mod., 100% | 2,670 | | 1,805 | 2,315 | | | 2,040 | 1,975 |
| Per Cent Retained (Tens., Elong.) | 96-63 | 67-15 | 80-38 | 83-46 | | | (72-37) | (71-36) |
| Per Cent Light Transmission | 17 | 13 | 10 | 10 | | | | |

PLASTICIZER VOLATILITY

| Per Cent Plasticizer Loss: | | | | | | | | |
|---|---|---|---|---|---|---|---|---|
| 4 Days @ 100° C | 17.5 | 15.9 | 16.3 | 3.9 | | | 8 | 10 |
| 7 Days @ 100° C | 28.8 | 26.5 | 25.1 | 8.6 | | | 13 | 15 |

OIL EXTRACTION

| Per Cent Plasticizer Loss: | | | | | | | | |
|---|---|---|---|---|---|---|---|---|
| 4 Days @ 52° C | 6.9 | 6.8 | 12.8 | 6.8 | | | 16.4 | 15.6 |
| 7 days @ 52° C | 9.1 | 9.3 | 16.6 | 8.3 | | | 19.8 | 18.9 |

DYNAMIC MODULUS, P. S. I. ×10⁻⁴

| Temperature, ° C.: | | | | | | | | |
|---|---|---|---|---|---|---|---|---|
| −25 | 1.3 | 1.46 | 1.00 | 2.12 | | | 1.4 | 1.3 |
| +10 | 4.12 | 4.64 | 2.72 | 5.47 | | | 3.2 | 3.0 |
| −5 | 12.6 | 12.8 | 7.50 | 12.6 | | | 6.6 | 6.6 |
| −20 | 21.1 | 23.3 | 15.6 | 21.7 | | | 11.2 | 11.2 |

BELL BRITTLENESS TEMPERATURE, ° F.

| | | | | | | | | |
|---|---|---|---|---|---|---|---|---|
| Non-Failure | −10 | −4 | | −20 | | | −50 | −40 |
| Failure | −15 | −10 | | −25 | | | −55 | −45 |

An important advantage of the particular esters of this invention is apparent from the data on the retention of modulus on aging. These results indicate that the four esters diisodecyl phthalate, diglycolate, sebacate and azelate are all superior to diisooctyl phthalate or to 2-ethyl hexyl phthalate with respect to retention of flexibility after aging. The use of these esters leads to a vinyl compound which does not stiffen on aging as shown by the modulus at 100% and significantly lower dynamic moduli measured over a range of temperatures. In addition, the loss in elongation is less than that which occurs with diisooctyl phthalate. The results also indicate that all these esters except the diglycolate are less volatile than either the di-2-ethyl hexyl phthalate or the diisooctyl phthalate while the diglycolate is better than di-2-ethyl hexyl phthalate and on a par with diisooctyl phthalate. The lower plasticizing effect of the phthalate at 25° C. can be overcome easily by blending with diisooctyl phthalate while retaining all of the advantages of the low temperature plasticization at low temperature and their reduced tendency to volatilize.

It is to be observed from the above data that the OXO alcohol diglycolate ester was an effective plasticizer for the vinyl resin. In particular, the compounds containing the $C_{10}$ sebacate and azelates are seen to have a brittle temperature 35 to 45° lower than the compound containing diisooctyl phthalate.

In summary, the novel invention relates to novel branched chain alkyl esters of polybasic acids such as phthalic, sebacic, diglycolic, and azelaic wherein the aliphatic alcohol used in the esterification reaction has 10 carbon atoms per molecule and is a mixture of isomers derived by oxonation of $C_9$ olefins. Furthermore, instead of esterifying the acid with the OXO alcohol directly, it may be advantageous to react the alcohol first with ethylene oxide to form an ether alcohol such as $$C_{10}H_{19}OCH_2.CH_2OH$$

and forming an ester from this ether alcohol, e. g. by reaction with phosphorus oxychloride.

In particular, the invention relates to plasticized resin compositions containing the novel esters as plasticizers, usually in proportions ranging from about 5 to 100 parts or preferably 30 to 60 parts per 100 parts of resin. Polymeric materials which lend themselves to successful plasticization with the esters of the invention include the various vinyl resins such as polyvinyl chloride, polyvinyl acetate, polyvinyl alcohol, mixed polymers of vinyl chloride with vinyl acetate, or vinylidine chloride, polyvinyl butyral or other polyvinyl acetals; nitrocellulose, ethyl cellulose; rubber-like polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. Mixtures of these classes of materials may be used, such as a mixture of 100 parts by weight of vinyl chloride resin with 10 to 300 parts by weight of butadiene-acrylonitrile synthetic rubber of 15 to 40% nitrile. It will be understood, of course, that in addition to the plasticizer, the polymer compositions may also contain conventional stabilizers such as basic lead carbonate, sodium borate or the like, oleic acid, auxiliary plasticizers or softeners, fillers, pigments and eventually also curing agents, when the polymer is of the curable type.

It will be understood further that the foregoing examples have been given merely for purposes of illustration, but that other modifications of the present invention are possible without departing from the scope of the appended claims.

This invention is a continuation-in-part of application Serial No. 91,424 filed May 4, 1949, now U. S. Patent No. 2,625,527.

The nature of the present invention having been thus fully set forth and specific examples of the same given, what is claimed as new and useful and desired to be secured by Letters Patent is:

1. A composition of matter comprising 100 parts of a resinous polymer of vinyl chloride, 30 to 60 parts of a neutral ester of an acid chosen from the group consisting of phthalic acid, sebacic acid, azelaic acid and diglycolic acid esterified with a mixture of branched chain primary aliphatic alcohols obtained by hydrogenating the product obtained by reacting a mixture of C—9 olefins with carbon monoxide and hydrogen at a temperature of 250 and 400° F., and pressures between 150 and 400 atmospheres consisting essentially of a mixture of isomeric alcohols having the formula $CH_2OHCR_1HCR_2R_3H$ and $CR_1H_2CR_2R_3CH_2OH$ wherein $R_1$, $R_2$, and $R_3$ are alkyl radicals and have from 1 to 5 carbon atoms and $R_1+R_2+R_3$ contain a total of 7 carbon atoms.

2. A composition of matter comprising 100 parts of a resinous polymer of vinyl chloride and 30 to 60 parts of an equal mixture of the neutral ester of phthalic acid esterifield with a mixture of $C_8$ isomeric alcohols obtained by hydrogenating the product obtained by reacting a mixture of $C_7$ olefins with carbon monoxide and hydrogen at a temperature between 250 and 400° F. and pressures between 150 and 400 atmospheres and the neutral ester of sebacic acid esterified with a mixture of $C_{10}$ isomeric alcohols obtained by hydrogenating the product obtained by reacting a mixture of $C_9$ olefins with carbon monoxide and hydrogen at a temperature between 250 and 400° F. and pressures between 150 and 400 atmospheres, said alcohols having the formulae $$CH_2OHCR_1HCR_2R_3H$$

and $CR_1H_2CR_2R_3CH_2OH$ wherein $R_1$, $R_2$, and $R_3$ are alkyl radicals and have from 1 to 5 carbon atoms; $R_1+R_2+R_3$ containing a total of 7 carbon atoms.

3. A composition of matter comprising 100 parts of a resinous polymer of vinyl chloride and 30 to 60 parts of an equal mixture of the neutral ester of phthalic acid esterified with a mixture of $C_8$ isomeric alcohols obtained by hydrogenating the product obtained by reacting a mixture of $C_7$ olefins with carbon monoxide and hydrogen at a temperature between 250° and 400° F. and pressures between 150 and 400 atmospheres and the neutral ester of azelaic acid esterified with a mixture of $C_{10}$ isomeric alcohols obtained by hydrogenating the product obtained by reacting a mixture of $C_9$ olefins with carbon monoxide and hydrogen at a temperature between 250 and 400° F. and pressures between 150 and 400 atmospheres, said alcohols having the formulae $$CH_2OHCR_1HR_2R_3H$$

and $CR_1H_2CR_2R_3CH_2OH$ wherein $R_1$, $R_2$, and $R_3$ are alkyl radicals and have from 1 to 5 carbon atoms; $R_1+R_2+R_3$ containing a total of 7 carbon atoms.

4. A composition of matter according to claim 1, in which the acid is diglycolic acid.

5. A composition of matter according to claim 1, in which the acid is phthalic acid.

6. A composition of matter according to claim 1, in which the acid is sebacic acid.

7. A composition of matter according to claim 1, in which the acid is azelaic acid.

References Cited in the file of this patent

UNITED STATES PATENTS

| | | |
|---|---|---|
| 2,015,077 | Lawson | Sept. 24, 1935 |
| 2,015,088 | Reid | Sept. 24, 1935 |